March 28, 1967 L. N. DOLHUN 3,311,382
STUFFING BOX REPLACEMENT SEAL
Filed Nov. 12, 1963
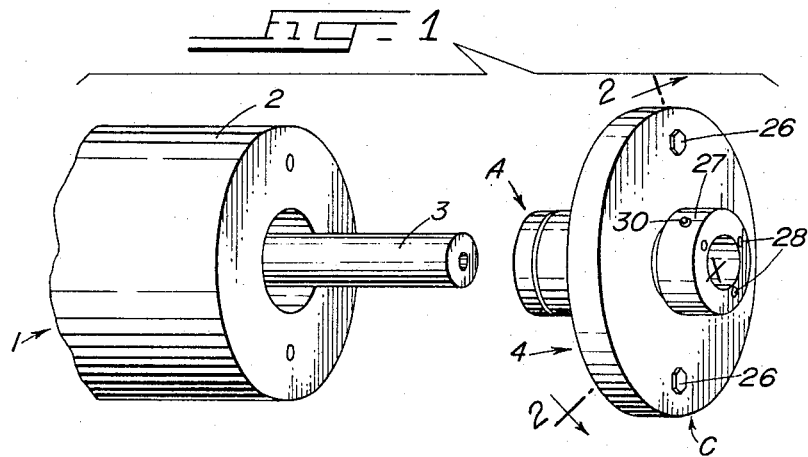
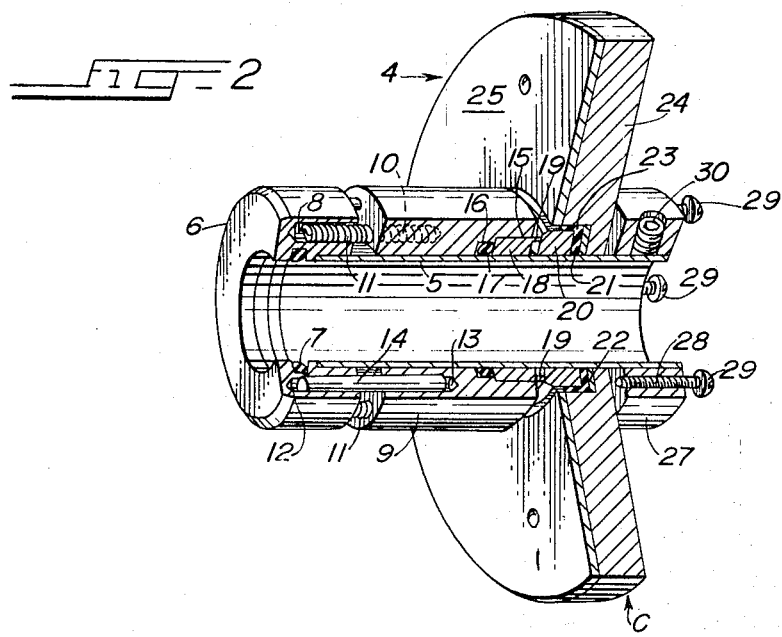
INVENTOR:—
LEONARD N. DOLHUN
BY:—
Marzall, Johnston, Cook & Root.
ATTYS.

United States Patent Office 3,311,382
Patented Mar. 28, 1967

3,311,382
STUFFING BOX REPLACEMENT SEAL
Leonard N. Dolhun, Rockford, Mich., assignor to AP Parts Corporation, a corporation of Michigan
Filed Nov. 12, 1963, Ser. No. 322,910
5 Claims. (Cl. 277—91)

This invention relates in general to seals, and has more particular reference to improvements in devices and structures for sealing shafts against longitudinal fluid leakage.

An important object of the invention is to provide improved stuffing box seals for fluid pumps or compressors.

Another object of the invention is to provide an improved seal especially adapted for use as a stuffing box replacement seal.

A further important object of the invention is to provide a shaft seal that can be readily secured in position on the shaft of a pump or compressor.

A still further object of the invention is to provide improved means for securing a fluid seal in a pump or compressor housing or the like in position to seal against fluid loss along the shaft or through the shaft accommodating opening of the housing.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

FIG. 1 is an exploded view, in perspective, showing the end of a pump housing and a seal unit of the invention; and FIG. 2 is a sectional view taken substantially along the line 2—2 in FIG. 1.

To illustrate the invention, the drawings show a portion of a pump housing 1 having a sleeve 2 forming a stuffing box through which the pump shaft 3 extends, and in which a seal unit 4 embodying the invention may be removably mounted to provide a seal between the shaft and the sleeve.

The seal unit 4 essentially comprises a pair of cooperating, relatively turnable seal rings 18 and 20, disposed in coaxial alinement, and ring mounting means sized for readily demountable assembly within the stuffing box sleeve 2 and formed to support the rings yieldingly in facing engagement, to form a running ground joint therebetween, and to connect the rings respectively with the shaft and the housing. To these ends, the seal unit 4 may comprise an assembly A for mounting one of the rings, such as the ring 18 on the shaft, said assembly being securable on the shaft 3 and sized to turn therewith within the stuffing box sleeve 2, and a cover C comprising a preferably circular plate adapted for attachment on the outer end of the sleeve 2 and formed to support one of the seal rings, such as the ring 20, on the housing 1, in position encircling the shaft in facing engagement with the cooperating ring 18.

As shown, the ring mounting assembly A may comprise a cylindrical mounting sleeve 5 preferably sized to fit snugly about the shaft 3. A ring forming a spring holder 6 may be soldered or brazed to one end of the sleeve 5. The spring holder 6 is preferably provided with an inwardly opening annular groove for the accommodation of a gasket ring 7 of resilient rubber-like plastic material adapted to form a fluid seal between the shaft 3 and the spring holder 6, at an end of the sleeve 5.

A seal ring carrier 9 comprising a sleeve member is slidingly supported on the mounting sleeve 5, adjacent the spring holder 6, which may be formed with a plurality of circularly spaced, axially extending sockets 8 opening upon the abutting end of the carrier 9, which may also be formed with axially extending, circularly spaced sockets 10 in alinement with the sockets 8 of the spring holder 6. Each of the socket pairs 8, 10, of which there are preferably at least three, have the opposite ends of a preferably helical compression spring 11 mounted therein and extending therebetween. The spring holder 6 and carrier 9 preferably have additional angularly spaced, axially extending, opposing pairs of sockets 12 and 13, each carrying a dowel pin or rod 14. The carrier ring 9 is sufficiently loosely fitted about the sleeve 5 that it is freely slidable thereon; there is a loose fit between the pins or rods 14 and at least one of the pin mounting sockets 12 and 13, so that the ring carrier 9 may freely move axially with respect to the spring holder 6, but may not turn relatively the one with respect to the other.

The end of the ring carrier 9 remote from the spring holder 6 may be formed internally with a stepped circumferential recess providing a seat 15 for the running seal ring 18, disposed around the sleeve 5 at the end of the carrier 9, and a seat 16 for a gasket ring 17 of resilient rubber-like plastic material adapted to form a fluid seal between the sleeves 5 and 9 adjacent the inner end of the running seal ring 18. The outer end of the ring 18 may be formed with a thin annular lip 19 projecting outwardly of the carrier 9 in position to bear upon the cooperating ring 20. The ring 18 is preferably made of carbon or other suitable material and is sized for snug interfitment in the recess 15 of the ring carrier 9, around the support sleeve 5. Consequently, the ring and its carrier rotate together as a unit.

The lip 19 bears in fluid sealing relationship upon a face of the seating ring 20, which preferably comprises ceramic or other suitable material. The seating ring 20 may be mounted on the cover plate 24 by means of a synthetic elastomer seal gasket 21, which may seat against a copper centering washer 22 disposed in a mounting recess 23 formed in the inner wall of the plate 24. The cover plate 24 and a plate sealing gasket 25 may be attached to the outer end of the sleeve 2, as by means of bolts 26.

The sleeve extends through and is freely turnable with respect to the seating ring 20, its mounting gasket 21, the washer 22, and the mounting plate 24. The outer end of the sleeve 5, remote from the spring carrier 6, projects outwardly of the plate 24 on the side thereof remote from the seating ring 20, said outwardly projecting end of the sleeve carrying, tightly fitted thereon, a collar 27 having at least one radially disposed set screw mounted in a threaded hole formed in the collar. It should be noted that the inner end of the set screw or screws 30 does not protrude through the sleeve 5 but rather bears against the outer surfaces thereof. Accordingly, when the seal unit is installed, the set screw or screws 30 may be tightened down onto the sleeve to squeeze it into gripping engagement with the shaft 3. As a consequence, the shaft is protected against set screw marring, and removal of the seal from the shaft is not hindered by burrs that might otherwise be produced if the set screw or screws were to be tightened directly onto the shaft.

The collar 27 may also be formed with a plurality of, and preferably at least three, equally spaced, axially extending tapped holes 28, a screw 29 being mounted in each tapped hole. The function of the screws 29 is to properly position the assembly A with respect to the cover C, to thereby determine the resilient pressure desirably applied by the springs 11 upon the ring carrier 9, that is to say, the yielding force applied on the ring 18 to urge it into sealing engagement with the seating ring 20. To this end, the screws are of selected length such that when the heads thereof are seated upon the outwardly facing end of the collar, the tips of the screws will hold the plate 24 in desired spacement away from the inner end of the collar, to thereby apply a desired tension in the springs 11. After the assembly A has been mounted in and the cover C bolted to the stuffing box 2, the set screw or screws may be tightened to secure the sleeve 5 upon the shaft. The screws 29 may then be removed and discarded, thereby assuring adequate end play between the housing mounted cover plate 24 and the shaft mounted clamping collar 27.

In operation, the shaft 3, sleeve 5, spring holder 6, ring carrier 9, and running seal ring 18 rotate as a unit. The springs 11 urge the ring carrier 9 and the ring 18 toward the end plate 24, thus maintaining a yielding pressure between the contacting faces of the ring 18 and the seating ring 20. The spring bias thus maintains a proper running seal between these parts as the contacting faces wear down as the result of relative rotation therebetween.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A shaft seal comprising a mounting plate formed with a shaft opening and adapted for demountable attachment on a housing wall in position embracing a shaft extending outwardly of the housing through the wall and said shaft opening, a seating ring secured to the inwardly facing side of said plate, around said shaft opening, a support sleeve extending through the mounting plate and seating ring at said shaft opening, said sleeve being sized to slidingly receive the shaft, means to seal the sleeve on the shaft against fluid flow through the sleeve axially of the shaft, an abutment collar secured on and extending outwardly of the sleeve, in position spaced from and facing the inwardly facing side of the mounting plate, a bushing embracing and movable axially of said support sleeve, between said collar and said plate, said bushing having a circular recess opening axially at its plate facing end, in alignment with said seating ring, a seal ring seated in said recess and slidingly supported on the sleeve in registration with said seating ring, and bias means on said collar resiliently urging the bushing axially of the sleeve in a direction to press the seal ring against the seating ring, and clamp means on said sleeve on the side of said plate remote from said seating ring, said clamp means being operable to detachably secure the sleeve against axial movement on the shaft.

2. A shaft seal as set forth in claim 1, wherein said clamp means comprises a collar secured on the sleeve, a clamping member on the collar for securing the same and said sleeve on the shaft, and removable spacing means on said collar for maintaining a selected spacement between the collar and the collar facing side of the mounting member, while the collar and sleeve are being secured to the shaft said spacing means comprising headed screw means extending through the collar, outwardly of the sleeve and parallel to its axis, in position presenting the head remote end portions of the screw means toward the collar facing side of the mounting plate for engagement therewith.

3. A shaft seal as set forth in claim 1, wherein said bias means comprises a plurality of circularly spaced helical compression springs supported on said abutment collar in position to press the bushing and the bushing mounted seal ring toward said seat.

4. A shaft seal as set forth in claim 3, wherein the opposite ends of the compression springs extend in circularly spaced spring mounting pockets disposed in facing alignment in the abutment collar and in the ring remote end of the bushing.

5. A shaft seal as set forth in claim 4, wherein the abutment collar and bushing are formed with sockets, in facing alignment and disposed between said spring mounting pockets, and spline pins extending at their opposite ends in said pockets for preventing relative rotation of the ring carrying bushing on the sleeve.

References Cited by the Examiner

UNITED STATES PATENTS

| 836,408 | 11/1906 | Somes | 277—91 |
|---|---|---|---|
| 2,844,393 | 7/1958 | Jensen | 277—87 |
| 3,020,056 | 2/1962 | Agens. | |
| 3,042,414 | 7/1962 | Tracy | 277—93 X |

LAVERNE D. GEIGER, *Primary Examiner.*

J. S. MEDNICK, *Assistant Examiner.*